United States Patent
Asano et al.

(10) Patent No.: US 8,605,744 B2
(45) Date of Patent: Dec. 10, 2013

(54) SEMICONDUCTOR INTEGRATED CIRCUIT DEVICE

(75) Inventors: Masahiro Asano, Kanagawa (JP); Yuriko Nishihara, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 75 days.

(21) Appl. No.: 13/322,271

(22) PCT Filed: Feb. 19, 2010

(86) PCT No.: PCT/JP2010/052540
§ 371 (c)(1), (2), (4) Date: Nov. 23, 2011

(87) PCT Pub. No.: WO2010/137365
PCT Pub. Date: Dec. 2, 2010

(65) Prior Publication Data
US 2012/0071990 A1 Mar. 22, 2012

(30) Foreign Application Priority Data
May 27, 2009 (JP) ................................ 2009-127478

(51) Int. Cl.
*H04J 3/16* (2006.01)
(52) U.S. Cl.
USPC .......................................... 370/458; 370/468
(58) Field of Classification Search
None
See application file for complete search history.

(56) References Cited

U.S. PATENT DOCUMENTS

| 7,170,876 B2 * | 1/2007 | Wei et al. ...................... 370/335 |
| 8,184,579 B2 * | 5/2012 | Shen et al. .................... 370/329 |
| 2003/0095532 A1 * | 5/2003 | Kim et al. ...................... 370/342 |

FOREIGN PATENT DOCUMENTS

| JP | 5-316124 A | 11/1993 |
| JP | 11-91212 A | 4/1999 |
| JP | 2005-145262 A | 6/2005 |
| JP | 2009-77126 A | 4/2009 |
| WO | WO 2004/055682 A1 | 7/2004 |

OTHER PUBLICATIONS

Extended European Search Report issued Nov. 19, 2012 in European Patent Application No. 10780325.6.

* cited by examiner

*Primary Examiner* — Min Jung
(74) *Attorney, Agent, or Firm* — Miles & Stockbridge P.C.

(57) ABSTRACT

In the upgrading of the ECU, an ECU 1 to be a master notifies other ECUs 1a and 1b of change of an ACK slot length. The ECUs 1a and 1b change the ACK slot length into an ACK slot length received from the ECU 1. At this time, the changed ACK slot length is stored in each register 5a provided in the ECUs 1a and 1b. Subsequently, the master ECU 1 transmits an upgrade data to each of the ECUs 1a and 1b at a communication speed corresponding to the changed ACK slot length. After completion of the upgrade, the ECU 1 notifies of change of the ACK slot length into the original ACK slot length. After receiving this, the ECUs 1a and 1b reset the ACK slot length to the notified original ACK slot length.

4 Claims, 5 Drawing Sheets

SEMICONDUCTOR INTEGRATED CIRCUIT DEVICE

TECHNICAL FIELD

The present invention relates to a communication technique in a communication network, and more particularly, the present invention relates to an effective technique to improve a communication speed in a communication network system which performs a communication via a CAN (Controller Area Network) bus.

BACKGROUND ART

For example, a CAN protocol is widely used as a communication protocol for LAN or others, and more particularly, a communication protocol for a motor-vehicle communication network.

In this CAN protocol, for example, when a receiver unit provided in an ECU (Electric Control Unit) or others normally receives a message, a response signal with 1 bit, which is called ACK, is transmitted from the corresponding receiver unit to a transmitter unit.

And, by receiving the ACK, the transmitter unit confirms that at least one or more units (ECUs) normally could have received the message.

As the communication technique with the LAN communication protocol of this type, a technique capable of achieving high-speed printing of a printer is known, in which, by providing an ACKX width variable circuit for changing an ACKX signal width and an ACKX width set key for setting an ACKX signal width related to the change in this ACKX width variable circuit, a data transfer speed from a host computer to the printer is improved as high as possible in accordance with performances of the host computer and the printer (see Patent Document 1).

PRIOR ART DOCUMENT

Patent Document

Patent Document 1: Japanese Patent Application Laid-Open Publication No. H11-91212

DISCLOSURE OF THE INVENTION

Problems to be Solved by the Invention

However, in the communication technique with the communication network protocol as described above, the following problems have been found out by the inventors.

In the CAN protocol, the transmitter unit needs to receive an ACK bit (1 bit) at an ACK (1 bit) slot position of a frame of the transmitter unit itself, the ACK bit being transmitted by the receiver unit at an ACK slot position (1 bit) of a frame. Therefore, propagation delay of 1 bit or more is not allowed at its standard.

As increasing the communication speed, the time for 1 bit is shorter (for example, 1 µs in 1 Mbps, 500 ns in 2 Mbps, and others). Therefore, in consideration of bus delay due to a length of harness connecting between units or delay required for a processing of a transceiver or others, the high speed of 1 Mbps or higher is difficult in the CAN communication.

For example, as shown in FIG. 5, in a configuration that an ECU 100 to be the transmitter unit and ECUs 101 and 102 to be the receiver units are connected to a CAN bus 103, if the transmission delay of 1 bit or more occurs in the ACK bit from the ECU 101, the ECU 100 cannot receive the ACK, which is from the ECU 101, within the ACK slot (1 bit) of itself, and therefore, the frame is destroyed, and the communication is not established.

In recent years, in motor vehicles, vehicle interior units have tended to increase, and information volume contained in one unit has increased as well, and therefore, a high-speed communication protocol between units has been required.

However, as the maximum communication speed of the CAN communication protocol, the high speed of 1 Mbps or higher is currently difficult as described above, and it is concerned that the information cannot be processed at the communication speed.

A preferred aim of the present invention is to provide a technique capable of achieving the high speed of the communication as maintaining compatibility with the communication protocol in the communication network.

The above and other preferred aims and novel characteristics of the present invention will be apparent from the description of the present specification and the accompanying drawings.

Means for Solving the Problems

The typical ones of the inventions disclosed in the present application will be briefly described as follows.

The present invention relates to a semiconductor integrated circuit device including a controller for controlling an actuator which performs a predetermined operation based on a message of a CAN protocol transferred via a communication bus, the controller includes a communication controlling unit for controlling the communication in accordance with the CAN protocol, and the communication controlling unit can arbitrarily change a slot length of a response signal for confirming the normal reception of the message from 1 bit to plural bits, so that the communication is performed at a communication speed corresponding to the response signal with the changed bit number. The ACK bit which is the response signal is 1 bit as much as that of the normal CAN protocol, and is transmitted at a timing of start of the ACK slot.

Also, other inventions of the present application are briefly summarized.

In the present invention, the communication controlling unit includes a first storage unit for storing the changed ACK slot length. In the notification of an ACK change protocol for changing the ACK slot length, the communication controlling unit stores an ACK slot length which is set by the ACK change protocol in the first storage unit, and changes the ACK slot length.

Also, in the present invention, the communication controlling unit includes: a first storage unit for storing the changed ACK slot length; and a second storage unit for storing a communication-enable maximum frequency. In the notification of a communication-speed inquiring protocol of inquiry about the maximum communication speed from a semiconductor integrated circuit device to be a communication master, a communication controlling unit which is provided in a semiconductor integrated circuit device not to be the communication master returns the communication-enable maximum frequency which is stored in the corresponding second storage unit, and stores an ACK slot length which is calculated by the semiconductor integrated circuit device to be the communication master into the first storage unit. The communication controlling unit which is provided in the semiconductor integrated circuit device to be the communication master calculates the ACK slot length from the frequency returned from the semiconductor integrated circuit device not to be the communication master, and notifies the semiconductor integrated circuit device not to be the communication master of the shortest slot length among the calculated ACK slot lengths, so that the communication is performed at a communication speed corresponding to a response signal with the changed slot length.

Effects of the Invention

The effects obtained by typical aspects of the inventions disclosed in the present application will be briefly described below.

(1) Since the ACK slot length of the semiconductor integrated circuit device which performs the communication by the CAN protocol can be arbitrarily changed, the communication speed can be increased without being limited by the harness length or others.

(2) Also, a large volume of information can be processed without losing reliability of the communication because of the above-described (1), and therefore, reliability and high performance of a communication system can be achieved.

BRIEF DESCRIPTIONS OF THE DRAWINGS

BEST MODE FOR CARRYING OUT THE INVENTION

Hereinafter, embodiments of the present invention will be described in detail with reference to the accompanying drawings. Note that the same components are denoted by the same reference symbols in principle throughout the drawings for describing the embodiments, and the repetitive description thereof will be omitted.

Figure 1:
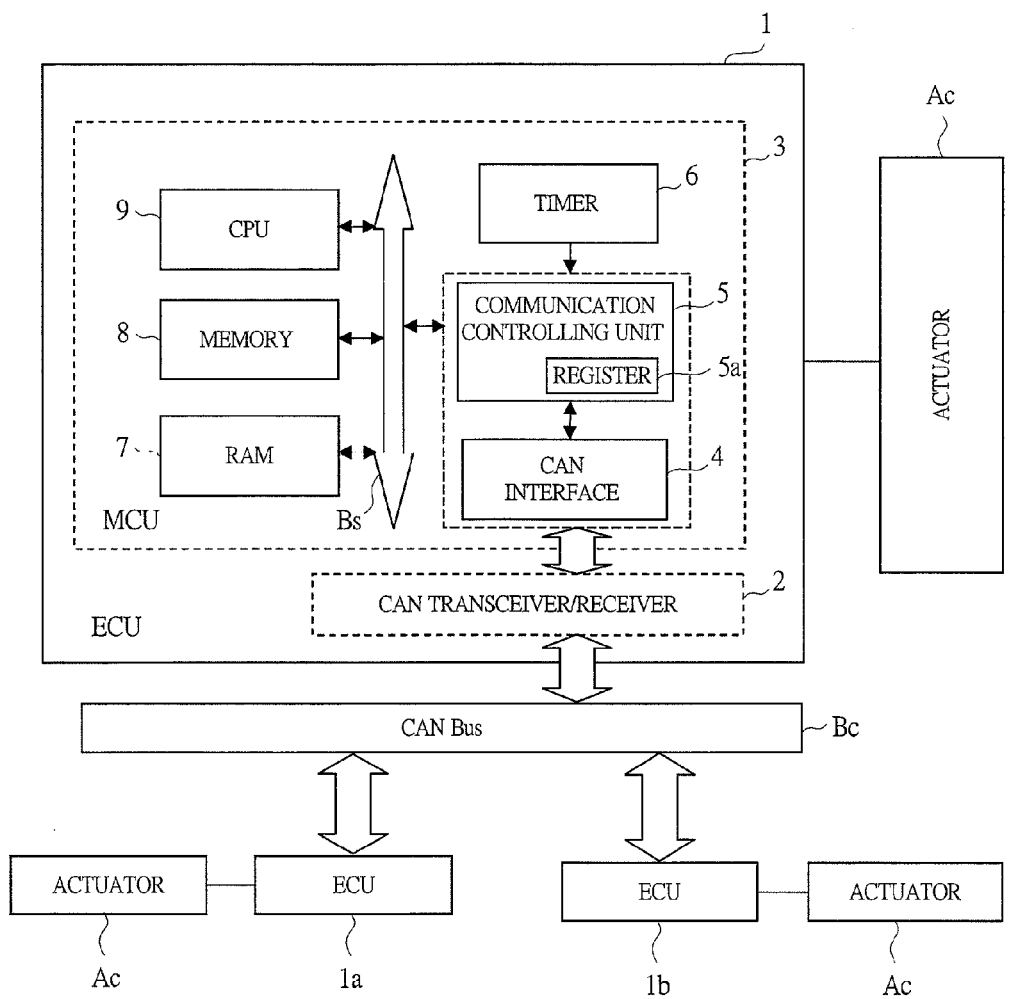
FIG. 1 is a block diagram showing an example of a connection mode of a vehicle interior network according to an embodiment of the present invention.
Figure 2:
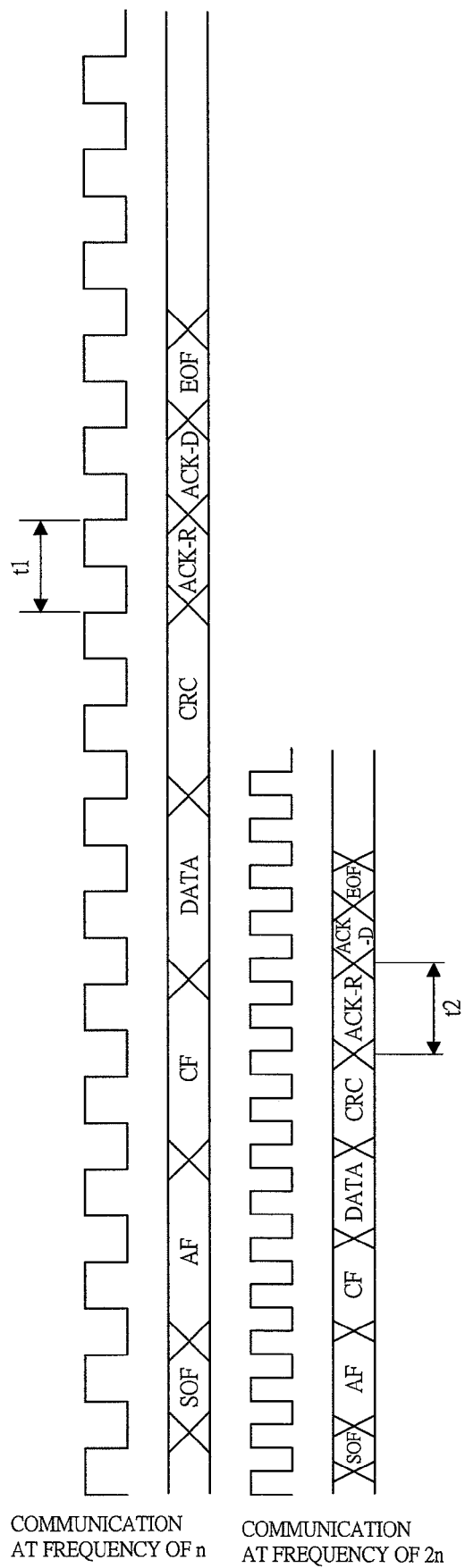
FIG. 2 is a timing chart showing an example of a frame transfer timing for explaining a changed ACK slot length used in a communication of an ECU of FIG. 1.
Figure 3:
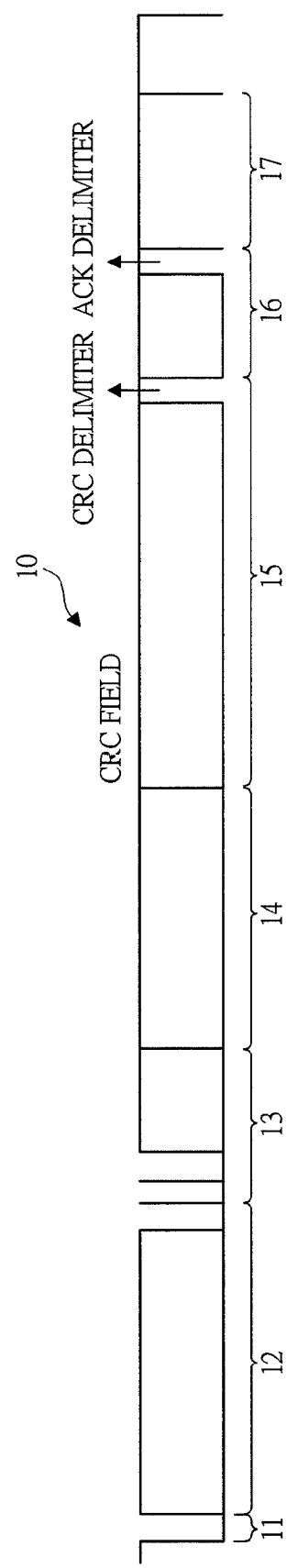
FIG. 3 is an explanatory diagram showing an example of a frame configuration in the ACK change of FIG. 2.
Figure 4:
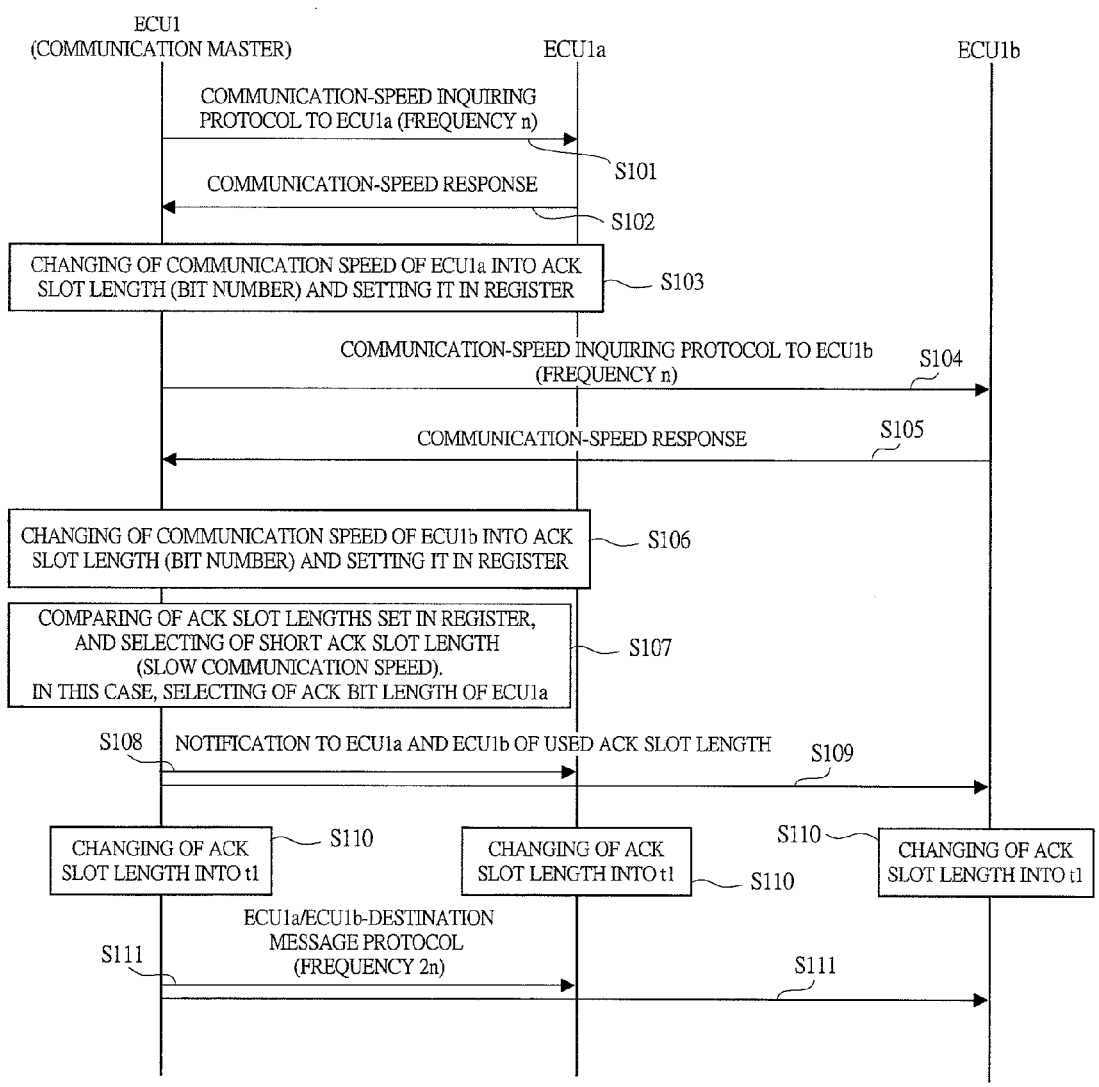
FIG. 4 is a flowchart showing an example of setting the ACK slot length by the ECU of FIG. 1.
Figure 5:
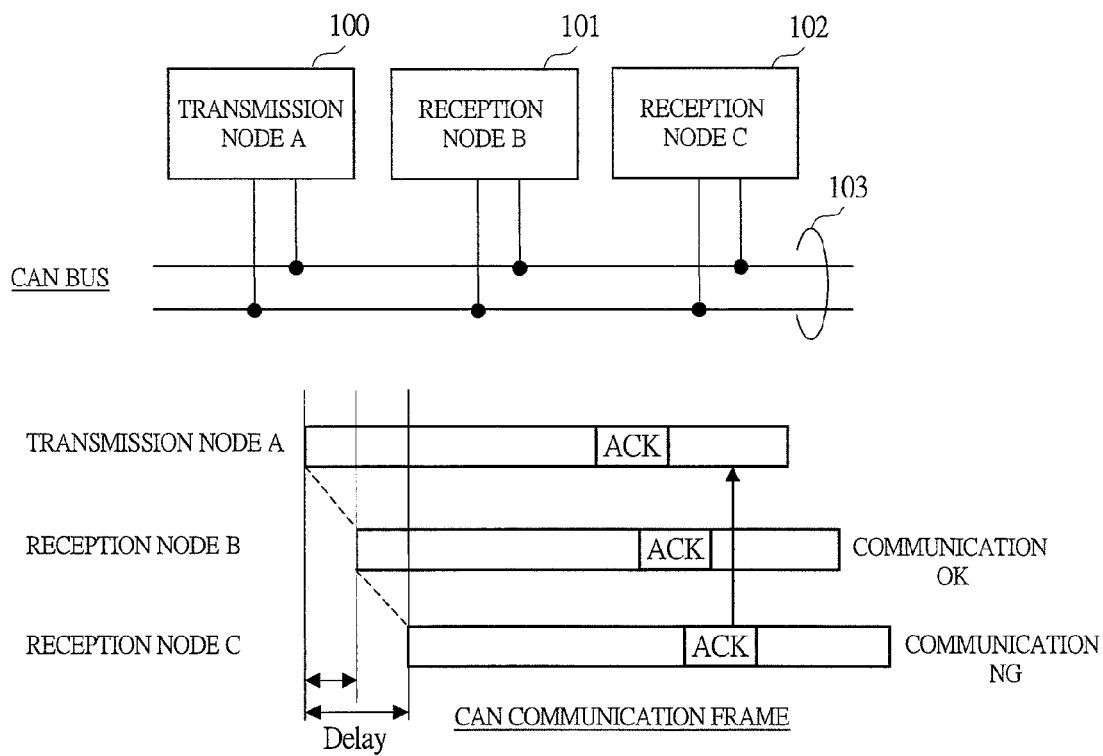
FIG. 5 is an explanatory diagram showing an example of a case that the ACK cannot be received due to response delay, which has been studied by the inventors.

FIG. 1 is a block diagram showing an example of a connection mode of a vehicle interior network according to an embodiment of the present invention, FIG. 2 is a timing chart showing an example of a frame transfer timing for explaining a changed ACK slot length used in a communication of an ECU of FIG. 1, FIG. 3 is an explanatory diagram showing an example of a frame configuration in the ACK change of FIG. 2, and FIG. 4 is a flowchart showing an example of setting the ACK slot length by the ECU of FIG. 1.

In the present embodiment, as shown in FIG. 1, the connection mode of the vehicle interior network of the motor vehicle has a configuration in which a plurality of ECUs 1, 1a, and 1b are mutually connected to each other via a CAN bus Bc to be a communication bus. However, the connection of the ECUs to an actuator is not always necessary.

These ECUs 1, 1a, and 1b are semiconductor integrated circuit devices which manage each control of, for example, information of a navigation system, an audio, or others, a power train system such as an engine and a chassis, a body system such as an air conditioner, a headlight, and a door lock.

Also, to the ECUs 1, 1a, and 1b, an actuator Ac controlled by each of the ECUs 1, 1a, and 1b is connected, respectively.

The ECU 1 includes: a CAN transceiver/receiver 2; and a MCU (Micro controller Unit) 3 to be a controller. The ECU 1 is mutually connected to the CAN bus Bc via the CAN transceiver/receiver 2. To the CAN bus Bc, a differential signal with the CAN protocol is transferred.

The CAN transceiver/receiver 2 converts the differential signal, which is inputted thereto via the CAN bus Bc, into a digital signal and outputs the signal to the MCU 3, and besides, converts the digital signal, which is outputted from the MCU 3, into the differential signal and outputs the signal to the CAN bus Bc.

The MCU 3 includes: a CAN interface 4; a communication controlling unit 5; a timer 6; a RAM (Random Access Memory) 7; a memory 8 which is formed of a nonvolatile semiconductor memory or others as exemplified by a flash memory; and a CPU (Central Processing Unit) 9. Also, the communication controlling unit 5, the timer 6, the RAM 7, the memory 8, and the CPU 9 are mutually connected to each other via an internal bus Bs.

The CAN interface 4 is an interface between the MCU 3 and the CAN bus Bc. The communication controlling unit 5 controls the communication with other ECUs in accordance with the CAN protocol. Also, the communication controlling unit 5 includes a register 5a which is functioned as a first storage unit and a second storage unit, and has a function of statically changing the bit number of the ACK, which is the response signal of the ACK slot length, based on the information stored in the corresponding register 5a.

The timer 6 counts up as a timer clock or others to set the desired time, and outputs a timer counter signal when the count reaches certain time. The RAM 7 is used for temporary storage of the data, and is used for, for example, temporary save of the data received from the CAN network or transmitted to the CAN network.

The memory 8 is formed of a nonvolatile semiconductor memory as exemplified by a flash memory, and mainly stores an operational program of the MCU 3. The operational program is, for example, a CAN communication program, an actuator control program, or others. The CPU 9 manages all controls in the MCU 3.

Here, the configuration of the ECU 1 has been described. And, other ECUs 1a and 1b also have the similar configuration to that of the ECU 1.

Next, operations of the ECUs 1, 1a, and 1b according to an embodiment are explained.

First, as an example, a rewriting technique of a control program for the vehicle-mounted ECUs 1, 1a, and 1b is explained.

When a program or data (hereinafter, referred to as program or others) which is stored in a nonvolatile memory in each of the vehicle-mounted ECUs is upgraded, a usual case is that a program or others for not only the ECU to be changed but also all ECUs is changed into a new data. Normally, since the communication is performed at about 1 Mbps or lower, it takes long time for upgrading all ECUs.

Accordingly, only in upgrading the program or others for all ECUs, it is set to change the ACK bit length into plural bits, for example, about 2 bits, for increasing the communication speed.

First, the ECU 1 to be the master notifies all ECUs 1a and 1b of the change of the ACK slot length (for example, slot length twice as long as a normal length). In the ECUs 1a and 1b, the slot length is changed into the ACK slot length received from the master ECU 1. At this time, the changed ACK slot length is stored in the register 5a provided in each of the ECUs 1a and 1b.

In the communication based on the CAN protocol, an arbitrary ECU among the plurality of vehicle-mounted ECUs can be the master ECU. In this example, the ECU corresponds to an ECU which can receive the input of the new program from an outside, such as a navigation system and a wireless network transmitter/receiver connected to a vehicle exterior network.

Subsequently, the master ECU 1 transmits the new program or others for the upgrade to each of the ECUs 1a and 1b at the communication speed corresponding to the changed ACK slot length. Then, after completing the upgrade of all ECUs 1, 1a, and 1b, the master ECU 1 notifies them of the change of the ACK slot length into an original ACK slot length. After receiving this, the register 5a of each of the ECUs 1a and 1b stores the notified ACK slot length.

As described above, in the update of the program or others for the ECUs, the ACK slot length can be changed to improve the communication speed, and therefore, the update time can be considerably shortened.

FIG. 2 is a timing chart showing an example of a frame transfer timing for explaining the changed ACK slot length.

The timing chart shown above in FIG. 2 indicates the frame transfer timing at a frequency "n" of a transfer rate (communication frequency) used in the normal CAN communication, and the timing chart shown below in FIG. 2 indicates a frame transfer timing at a frequency "2n" of a transfer rate which is twice as much as the frequency "n".

As shown in the figure, an ACK slot length "t1" whose transfer rate is the frequency "n" and an ACK slot length "t2" whose transfer rate is the frequency "2n" are equal to each other in the length. However, one value obtained by converting each slot length into a bit number is twice as much as a bit number of the other.

As described above, when the transfer rate is twice, a width for 1 bit is ½ (half), and therefore, it is required that the bit number of the ACK slot length is set to twice. Therefore, when the communication speed is set to twice, for example, 2 cycles having the same time (ACK slot length t2) as the ACK slot length t1 with the frequency "n" are calculated as the bit number for setting the ACK slot.

FIG. 3 is an explanatory diagram showing an example of a configuration of a frame 10 in the change of the ACK slot length.

As shown in the figure, the frame 10 includes: a SOF (Start Of Frame) 11; an arbitration field 12; a control field 13; a data field 14; a CRC field 15; an ACK field 16; and an EOF (End Of Frame) 17.

The SOF 11 indicates the start of the frame, and the arbitration field 12 contains, for example, an ID value and a RTR (Remote Transmission Request). The control field 13 is a field indicating a reserved bit and number of bytes of a data, and the data field 14 contains a data with plural bits (for example, 64 bits).

The CRC field 15 is a field for checking a transfer error, and contains a CRC and a CRC delimiter indicating the end of the CRC. The ACK field 16 is a field for confirming the completion of the normal reception, and contains an ACK and an ACK delimiter indicating the end of the ACK. The EOF 17 indicates the end of the frame.

Here, the ACK slot length in the ACK field 16 can be arbitrarily variably set from 1 bit to plural bits (in this example, about 4 bits).

In a latter part of the CRC field 15, the maximum bit number in which "H" is continuously transmitted is 4 bits in consideration of a bit-stuffing function. The bit-stuffing function is a function that, when 5 bits at the same level bit are continued during from the SOF 11 to the CRC field 15, a bit whose level is reversed is added into a next bit. Also, when "H" is continued during continuous 11 bits, other ECU detects the bus idle, and there is a possibility that the frame is transmitted to the bus.

Therefore, a range allowed as the ACK field (ACK slot) is 5 bits as expressed from "10 bits−(remaining 4 bits in the CRC field+1 bit in the CRC delimiter)". And, if an error of a local clock owned by each ECU is assumed as, for example, about 1 bit, the error is expressed as "5 bits−1 bit=4 bits".

Therefore, here, the ACK slot length is set to 4 bits (which is variable in a range of 1 to 4 bits) at a maximum. Also, in the ACK slot length, 1 bit is a default value, and, when the ACK slot length is 1 bit, it can be used similarly to the normal CAN protocol.

Next, a setting technique of the ACK slot length in a case of connecting the ECUs handling a plurality of different communication speed is explained with reference to the flowchart of FIG. 4.

Here, it is assumed that the ECU 1 is the communication master, the ECU 1a can perform the communication at the communication speed (communication frequency) of the 2n frequency at a maximum, and the ECUs 1 and 1b can perform the communication at the communication speed (communication frequency) of the 4n frequency at a maximum. Also, the following processing is mainly performed by, for example, the communication controlling unit 5.

First, the master ECU 1 inquiries the ECU 1a about the maximum communication speed of the corresponding ECU 1a (step S101). The ECU 1a replies to the ECU 1 about the previously-set maximum communication speed (2n frequency) (step S102).

The ECU 1 calculates the ACK slot length t1 from the communication speed of the ECU 1a received by itself, and stores the result in the register 5a of the ECU 1 as the bit number (step S103). Subsequently, the ECU 1 inquires the ECU 1b about the maximum communication speed of the corresponding ECU 1b (step S104). The ECU 1b replies to the ECU 1 about the previously-set maximum communication speed (4n frequency) (step S105).

The ECU 1 calculates the ACK slot length t2 from the communication speed of the ECU 1b received by itself, similarly to the processing of the step S103, and stores the result in the register 5a of the ECU 1 as the bit number (step S106).

And, the ECU 1 compares the ACK slot length t1 and the ACK slot length t2 which are stored in the register 5a, and selects a value (t1) with the smallest bit number (step S107).

Subsequently, the ECU 1 notifies the ECU 1a and the ECU 1b of the selected ACK slot length (bit number) (steps S108 and S109). In the ECUs 1, 1a, and 1b, a change processing of the communication speed and slot length is performed (step S110), and the CAN communication at the frequency of 2n is started (step S111).

Note that, if the ACK slot length of each ECU is determined in a system designing stage, a protocol of the inquiry about the ACK cycle is unnecessary.

Also, in FIG. 4, the master ECU 1 performs the processing of inquiring other ECUs 1a and 1b about the communication speed and selecting the shortest ACK slot length. However, the master ECU 1 may inquire other ECUs 1a and 1b about not the communication speed but the ACK slot length (the maximum bit number which can be handled) and select the smallest bit number.

In this manner, even in a system configuration having the mixed ECUs whose communication speed is different from each other, the most-effective communication speed can be flexibly selected, and therefore, the communication speed can be increased.

In this manner, according to the present embodiment, the ACK slot lengths in the ECUs 1, 1a, and 1b can be arbitrarily changed, and therefore, the communication speed can be increased without being limited by the harness length or others.

Also, the ACK slot length can be set to even 1 bit, and therefore, the compatibility with the normal CAN communication protocol can be maintained.

INDUSTRIAL APPLICABILITY

The present invention is suitable for a technique of improving a communication speed in a semiconductor integrated circuit device used for a communication system of a motor vehicle or others.

The invention claimed is:

1. A semiconductor integrated circuit device comprising:
a controller configured to generate a message of a Controller Area Network (CAN) protocol transferred via a communication bus,
wherein the controller includes a communication control unit for controlling a communication in accordance with the CAN protocol and for generating the message, said message including an ACK slot for receiving an ACK signal from another semiconductor integrated circuit device, and
wherein the communication control unit is configured to determine a length of the ACK slot as one of a plurality of bit lengths and 1 bit length in accordance with whether a communication speed being higher than a predetermined communication speed or not.

2. The semiconductor integrated circuit device according to claim 1, wherein
the communication controlling unit includes:
a first storage unit for storing a changed ACK slot length, and,
in notification of an ACK change protocol for changing the ACK slot length to said another semiconductor integrated circuit device, the communication controlling unit stores the length of the ACK slot, which is set by the ACK change protocol in the first storage unit, and changes the length of the ACK slot.

3. A communication system comprising:
at least first and second semiconductor integrated circuit devices each said first and second semiconductor integrated circuit devices including
a controller configured to generate a message of a Controller Area Network (CAN) protocol transferred via a communication bus,
the controller including a communication control unit for controlling a communication in accordance with the CAN protocol and for generating the message, said message including an ACK slot for receiving an ACK signal from one of said semiconductor integrated circuit devices, and
the communication control unit being configured to determine a length of the ACK slot as one of a plurality of bit lengths and 1 bit length in accordance with whether a communication speed being higher than a predetermined communication speed or not,
wherein the communication control unit in each of said semiconductor integrated circuit devices including
a first storage unit for storing a changed length of the ACK slot; and
a second storage unit for storing a communication-enable maximum frequency,
wherein, in notification of a communication-speed inquiry about a maximum communication speed from said first semiconductor integrated circuit device to said second semiconductor integrated circuit device, the communication control unit in said second semiconductor integrated circuit device replies thereto about the communication-enable maximum frequency stored in the second storage unit, and stores the length of the ACK slot which is calculated by the first semiconductor integrated circuit device in the first storage unit, and
wherein the communication control unit in the first semiconductor integrated circuit device calculates the length of the ACK slot using the communication enable maximum frequency received from the second semiconductor integrated circuit device as the communication speed, and notifies a calculated result as the length of the ACK slot to the second semiconductor integrated circuit device, so that communication is performed at the communication speed corresponding to the communication enable maximum frequency received from the second semiconductor integrated circuit device.

4. The communication system according to claim 3,
wherein, when one of the communication enable maximum frequencies of one of the semiconductor integrated circuit devices is slower than the communication enable maximum frequency of the other semiconductor integrated circuit device, the communication controlling unit in said one semiconductor integrated circuit device uses a slower one of the communication enable maximum frequencies as the communication speed.

* * * * *